United States Patent [19]

Lester

[11] 4,347,808
[45] Sep. 7, 1982

[54] FROG FEEDING APPARATUS

[76] Inventor: Dozier Lester, 1156-F Guilbeau Rd., Duson, La. 70529

[21] Appl. No.: 226,057

[22] Filed: Jan. 19, 1981

[51] Int. Cl.³ .................................................. A01K 5/02
[52] U.S. Cl. ....................................... 119/51 R; 221/254
[58] Field of Search ............... 119/51 R, 51.11, 56 R; 221/210, 217, 254; 222/221, 342

[56] References Cited

U.S. PATENT DOCUMENTS

| | | | |
|---|---|---|---|
| 1,352,411 | 9/1920 | Hutton | 221/217 |
| 2,646,191 | 7/1953 | Wechsler | 222/221 |
| 2,793,791 | 5/1957 | Clark | 119/56 R X |
| 2,800,256 | 7/1957 | Di Nuzzo | 119/51 R X |
| 3,072,301 | 1/1963 | Burke | 222/342 |
| 3,279,434 | 10/1966 | Evans | 119/56 R |
| 3,528,588 | 9/1970 | Moore | 119/51 R |

*Primary Examiner*—Gene Mancene
*Assistant Examiner*—Robert P. Swiatek
*Attorney, Agent, or Firm*—John M. Harrison

[57] ABSTRACT

An apparatus for feeding frogs which includes a suspended frame carrying a hopper for containing particles of food suitable for the frogs, with a wheel mounted on the frame and mounted for rotation with respect to the hopper and carrying engaging hooks for engaging the particles of food in the hopper and dropping the particles to the frogs located beneath the apparatus. In a preferred embodiment the apparatus is automated and will supply food particles to the frogs in timed sequences.

9 Claims, 7 Drawing Figures

FROG FEEDING APPARATUS

BACKGROUND OF THE INVENTION

CROSS-REFERENCE TO RELATED APPLICATIONS

A frog feeding apparatus for feeding frogs on a relatively small scale is disclosed and claimed in my U.S. Pat. No. 4,022,160, and an apparatus for feeding frogs on a much larger scale is disclosed in my U.S. Pat. No. 4,038,947.

FIELD OF THE INVENTION

This invention relates to an apparatus for feeding frogs by means of a suspended mechanism which dispenses food particles stored in the apparatus to frogs beneath the apparatus. The dispensing apparatus of this invention may be used both in commercial and private frog raising operations, and in a preferred embodiment the mechanism is automated and is capable of dispensing food particles in predetermined timed sequences to the frogs at a predetermined rate. The uneaten food which is dispensed to the frogs can be gathered and again placed in the storage hopper of the apparatus for redistribution by the machine.

DESCRIPTION OF THE PRIOR ART

Many experiments have been conducted regarding the feeding of frogs, and particularly, with the concept of developing a non-living food which is palatable to frogs and which may be used in large-scale frog raising operations. One problem encountered in the development of such foods is the reluctance of the frogs to eat any food other than live food, such as insects, minnows, worms, crawfish and the like. During the course of investigation it became apparent that a primary factor in the successful feeding of frogs is the necessity of effecting movement of the food offered to the frogs in order to simulate life. Such movement triggers the feeding instinct in the frogs, and it has been discovered that a frog will not eat at all, no matter how hungry it becomes, if the food is not actually alive or if it is not presented to the frog in a life-like manner. A second problem realized in feeding frogs is the difficulty in causing frogs to swallow the food once it is "captured". Typically, only live food stimulates the nerves in the frog's throat to cause the swallowing action, and "artificial" or non-living food does not have the required characteristics to induce this swallowing impulse. Accordingly, not only must the food be presented to the frog in a lifelike manner, but it must also be carefully designed to activate the nerves in the frog's throat and induce swallowing once it is "captured".

Heretofore and prior to the development of my apparatus claimed in my U.S. Pat. Nos. 4,022,160 and 4,038,947, there have been developed no known effective means for presenting non-living food to frogs on a large scale basis in such a manner that the frogs would first capture, and then ingest the food. To my knowledge, existing commercial feeding operations have been limited to the provision of live insects, worms, minnows and crawfish for feeding frogs. Such feeding techniques are difficult because of the limited availability of living food, such as insects, minnows and crawfish during certain seasons, and presenting such food to frogs in an environment where the food can be readily captured and eaten is difficult. Therefore, the problem lies in the difficulty of supplying sufficient live food to meet the demands of the frogs, particularly in the case of large scale frog raising operations.

Accordingly, it is an object of this invention to provide an overhead mounted, automated mechanism for imparting lifelike movement to non-living or artificial food in the feeding of frogs.

Yet another object of this invention is to provide an elevated frog food dispensing apparatus which contains a supply of food for the frogs and automatically dispenses individual particles of this food in timed sequences.

Yet another object of this invention is to provide an automated frog feeding mechanism which is characterized by a suspended frame carrying a rotatable, motor-driven wheel in cooperation with a food hopper containing a quantity of particulate food for the frogs, wherein the wheel is fitted with at least one food engaging means and is designed to rotate through the hopper, engage individual particles of food stored in the hopper, and dispense the food to the frogs located beneath the apparatus.

A still further object of the invention is to provide an overhead mounted frog feeding apparatus which is equipped to automatically dispense individual particles of food over a timed sequence or sequences, with the food being stored in a hopper located in the apparatus and presented to the frogs located beneath the apparatus in a manner calculated to simulate living, natural food.

A still further object of the invention is to provide an elevated, suspended frog feeding apparatus which includes a food container or hopper mounted on a frame in cooperation with a rotating wheel having at least one set of hooks for engaging individual particles of food stored in the hopper, and designed to drop the food as the wheel rotates, and further including a wire platform positioned beneath the apparatus for receiving the food and facilitating easy gathering of uneaten food particles.

SUMMARY OF THE INVENTION

These and other objects of the invention are provided in a frog feeding apparatus which includes an overhead suspended frame carrying a motor-driven, rotating wheel, the rim of which is provided with a food-engaging member or hook, and a food hopper containing a supply of particulate food for the frogs and located in close proximity to the wheel, with the engaging hook designed to periodically contact and engage individual particles of food in the hopper as the wheel rotates and cause the food to drop from the hook and the wheel for presentation to the frogs below in a lifelike manner.

BRIEF DESCRIPTION OF THE DRAWING

The invention will be better understood in view of the following description presented with reference to the accompanying drawing.

DESCRIPTION OF THE PREFERRED EMBODIMENTS

Figure 1:
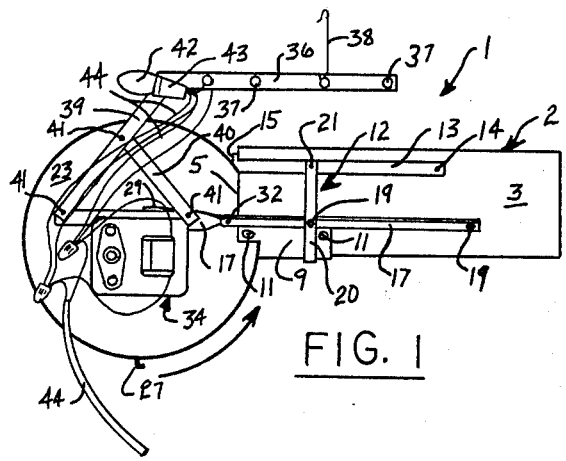
FIG. 1 is a right side elevation of the dispensing apparatus of this invention.
Figure 2:
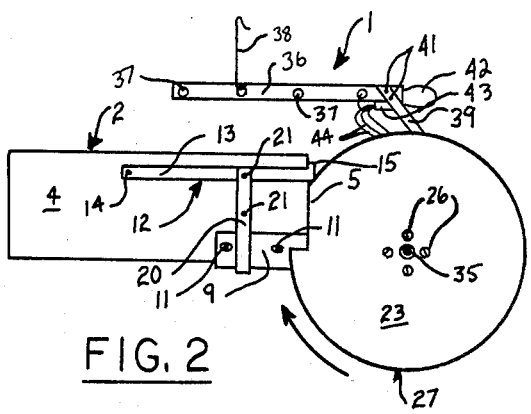
FIG. 2 is a left side elevation of the dispensing apparatus illustrated in FIG. 1.

Referring now to FIGS. 1 and 2 of the drawing the frog feeding dispensing apparatus of this invention is generally illustrated by reference numeral 1, and includes a hopper 2, having a right bottom segment 3 and a left bottom segment 4, and supported by a hopper frame 12. Hopper frame 12 further includes a pair of bottom stiffeners 13, each terminating in a stiffener flange 15 at one end thereof, and attached to right bottom segment 3 and left bottom segment 4, respectively, by means of stiffener rivets 14. Bottom stiffeners 13 are maintained in generally parallel relationship on right bottom segment 3 and left bottom segment 4, respectively, by means of a saddle bracket 20, the ends of which are secured to bottom stiffeners 13 by means of bracket rivets 21. An additional bracket rivet 21 serves to secure one leg of saddle bracket 20 to the left bottom segment 4 of hopper 2, as illustrated in FIG. 2. Saddle bracket 20 also stabilizes a wheel bracket 17, which is mounted on right bottom segment 3 of hopper 2 in generally parallel relationship to bottom stiffeners 13, and extends forward of hopper 2. Bracket bolts 18, with cooperating bracket nuts 19 serve to secure wheel bracket 17 on right bottom segment 3 and to connect wheel bracket 17 and saddle bracket 20.

Figure 3:
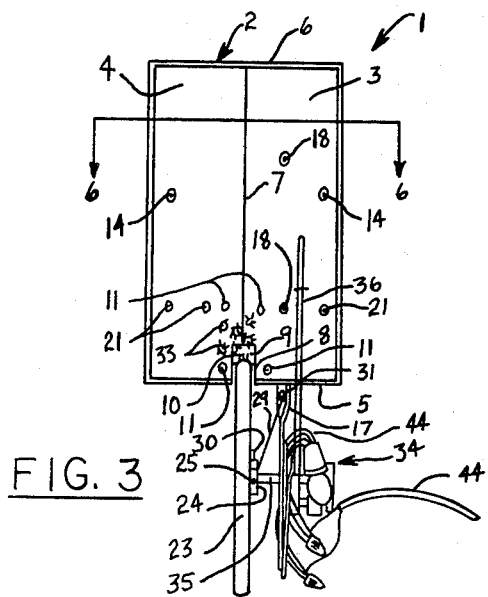
FIG. 3 is a top elevation of the dispensing apparatus.
Figure 4:
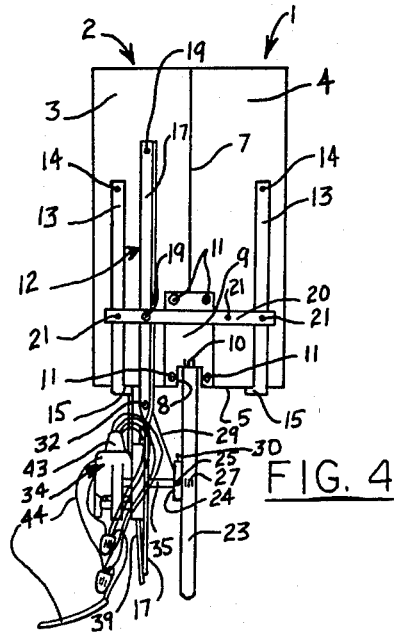
FIG. 4 is a bottom elevation thereof.
Figure 5:
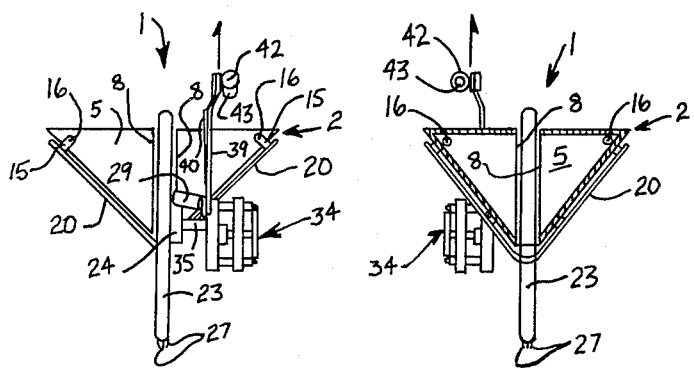
FIG. 5 is a front elevation of the dispensing apparatus, which is illustrated without wiring.
Figure 6:
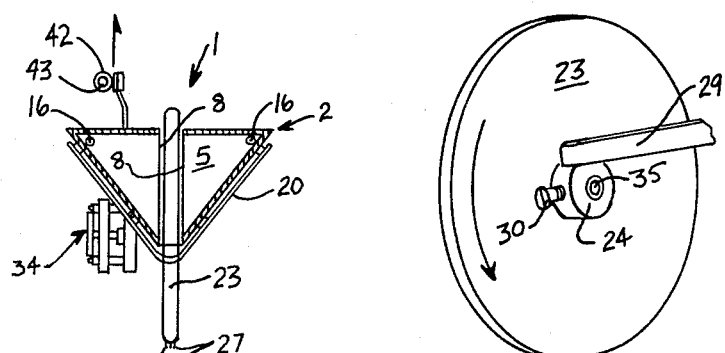
FIG. 6 is a sectional view taken along lines 6—6 in FIG. 3 of the dispensing apparatus of this invention, also without wiring.

Referring now to FIGS. 1–6 of the drawing, and to FIGS. 3 and 4 specifically, it will be appreciated that in a preferred embodiment of the invention hopper 2 is open at the top with right bottom segment 3 and left bottom segment 4 extending in a V-shaped configuration to define the top opening, and join at bottom seam 7. Accordingly, hopper 2 is defined by right bottom segment 3, left bottom segment 4, front end 5, and rear end 6, as illustrated in FIG. 3. In a further preferred embodiment of the invention a wheel slot 8 is provided in front end 5 and in the forward end of right bottom segment 3 and left bottom segment 4. A flexible food seat 9, provided with seat slots 10 which are positioned at the base of wheel slot 8, is secured to right bottom segment 3 and left bottom segment 4 of hopper 2 by means of seat rivets 11. As illustrated in FIG. 5, stiffener flanges 15 of bottom stiffeners 13 are secured to front end 5 by means of flange rivets 16.

To the extending end of wheel bracket 17 is attached an electric motor 34, which carries a wheel 23 by means of a drive shaft 35, inserted in a hub 24, attached to wheel 23 by means of hub bolts 26, illustrated in FIG. 2. Wheel 23 is aligned with, and extends into wheel slot 8 in front end 5, right bottom segment 3 and left bottom segment 4, with the outer periphery of wheel 23 in contact with food seat 9 immediately adjacent to the seat slots 10, as illustrated in FIGS. 3 and 4. Drive shaft 35 is securely maintained in hub 24 by means of a set screw 25, and an engaging bolt 30 is threadably secured in hub 24 and extends from the periphery of hub 24 as illustrated. Alternatively, engaging bolt 30 can serve to secure hub 24 tightly onto drive shaft 35 without the necessity of using set screw 25. One end of a vibrator 29 is secured to wheel bracket 17 by means of a vibrator bolt 31 and a cooperating vibrator nut 32, while the opposite end of vibrator 29 is curved and is positioned in the path of engaging bolt 30. This positioning of engaging bolt 30 permits it to contact the curved end of vibrator 29 as wheel 23 is caused to rotate in order to bend the vibrator and cause it to snap back, effecting vibration in hopper 2, as hereinafter described.

Referring again to FIG. 1 of the drawing the projecting forward portion of wheel bracket 17 carries one end of a forward mount 39 and a rear mount 40, in spaced relationship, with the opposite end of rear mount 40 projecting upwardly to contact and join forward mount 39 by means of a mount rivet 41. The opposite end of forward mount 39 extends beyond its juncture with rear mount 40, and carries a generally horizontally disposed support bracket 36, which is aligned above and in generally parallel relationship to bottom stiffeners 13 and wheel bracket 17, and is attached to forward mount 39 by means of additional mount rivets 41, as illustrated in FIG. 2. Support bracket 36 is provided with spaced support bracket apertures 37, which are designed to accommodate a hook 38 for suspending dispensing apparatus 1 above an enclosure containing frogs. A light 42, secured in light socket 43, is also carried by support bracket 36, and the wiring 44, connected to light socket 43 and motor 34 serves to electrically connect light 42 and motor 34 to a source of electric power. Referring again to FIGS. 1, 2, 5 and 6, in a preferred embodiment of the invention, at least one set of engaging hooks 27 are provided on the outer periphery of wheel 23 and are designed to align with seat slots 10 when wheel 23 is caused to rotate in the direction indicated by the arrow, upon activation of motor 34.

In operation, and referring again to the drawing, the dispensing apparatus 1 is used to feed frogs by initially suspending the apparatus from a suitable mount point above an enclosure containing the frogs by means of hook 38. In a preferred embodiment of the invention it is desirable to suspend dispensing apparatus 1 with wheel 23 and hopper 2 tilting downwardly by selecting an appropriate support bracket aperture 37 for engaging hook 38, to insure that food particles 33, which are illustrated in FIG. 3 of the drawing, are caused to move forwardly toward front end 5, positioned in stacked relationship on food seat 9 of hopper 2. This forward tilting attitude of hopper 2 and wheel 23 insures a reliable, individual dispensing of the food particles 33 as wheel 23 rotates in the direction indicated by the arrow. After dispensing apparatus 1 is suspended over the enclosure as described above, a wire mat or frame may be placed beneath the apparatus, if desired, to receive the dispensed food particles 33 not "captured" by frogs, and wiring 44 is plugged into a wall socket or into a timing device, as desired, in order to activate motor 34 and effect rotation of wheel 23 at a desired speed. As wheel 23 is rotated in the direction of the arrow responsive to the operation of motor 34, engaging hooks 27 rotate through seat slots 10 and engage one of the food particles 33 which is positioned on food seat 9 and seat slots 10, as illustrated in FIG. 3. Continued rotation of wheel 23 causes engaging hooks 27 and the engaged food particle 33 to move away from hopper 2 and to continue in a rotary path with wheel 23, until the food particle drops from engaging hooks 27 by operation of gravity as engaging hooks 27 rotate past the vertical position. The food particle thus dispensed is generally "captured" by one of the frogs beneath the dispensing apparatus 1 before it reaches the floor. In the alternative, if the dispensed food particle is not captured by a frog, it falls on the wire mesh platform positioned beneath the apparatus, and it may be retrieved and again placed in hopper 2.

It will be appreciated by those skilled in the art that wheel 23 can be provided with an additional set or sets of engaging hooks 27 as desired, in order to provide additional dispensing capacity for the apparatus. Furthermore, the rotational speed of motor 34 and wheel 23 can be adjusted by gearing or an appropriate speed control means known to those skilled in the art, in cooperation with the addition of more engaging hooks 27 as desired, to greatly increase the capacity of the apparatus. It will be further appreciated that the dispensing apparatus of this invention can be used either during the daytime or at night, and in the latter case, the timed sequence or sequences can be wired to activate light 42 during the feeding cycle.

Figure 7:
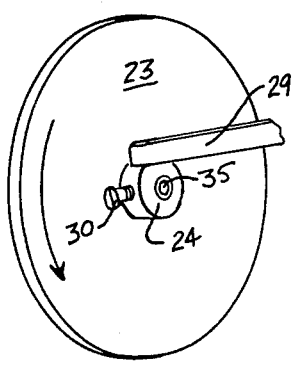
FIG. 7 is a perspective sectional view, more particularly illustrating a preferred method of vibrating the food particles contained in the hopper of the apparatus to insure engagement of the food by the rotating wheel.

In a most preferred embodiment of the invention, and referring again to FIGS. 3, 4 and 7 of the drawing, the vibrator 29 is designed to vibrate the suspended hopper 2 when contacted by engaging bolt 30 as wheel 23 rotates. This mechanical arrangement is designed to insure that food particles 33 are periodically shifted to the forward end of hopper 2, and that one of food particles 33 is always located on food seat 9 immediately adjacent to seat slots 10 for pickup by engaging hooks 27. Accordingly, as wheel 23 rotates, engaging bolt 30 periodically contacts the curved end of vibrator 29 and causes vibrator 29 to first extend, and then to snap back vigorously to vibrate hopper 2 and achieve the desired shifting of food particles 3.

A primary feature of the dispensing apparatus of this invention is portability, the apparatus being susceptible of location to virtually any enclosure where frogs are present, and where electricity is available. In less accessible areas, a battery powered motor 34 can be utilized, according to the knowledge of those skilled in the art. Furthermore, the system permits reuse of all particulate frog food dispensed by the apparatus which is not immediately captured by the frog and which collects on the floor or on the raised wire platform positioned immediately below the apparatus. The device enables automatic feeding of a selective number of frogs according to timed sequences at a desired output, with minimum attention by an operator. In the case of large scale frog raising operations, multiple units can be used according to the number of frogs to be fed. The dispensing apparatus of this invention is simple, easy to maintain and is highly reliable, and will dispense particles of food of varying size in a highly efficient manner. As heretofore described, the rotational dispensing speed of the device is variable and can be increased by simply increasing the motor speed or gearing to increase the rate of rotation of wheel 23, or by increasing the number of engaging hooks 27 positioned on the periphery of the wheel, or by both expedients.

Having described my invention with the particularity set forth above, what is claimed is:

1. A frog feeding apparatus for automatically dispensing particles of food to frogs comprising:
   (a) a hopper defined by two sides disposed in a generally V-shaped cross-section, and a first end closing one end of said hopper and a second end closing the opposite end of said hopper, said first end having a slot for containing and providing access in removing said particles of food;
   (b) a frame attached to said hopper and including a bracket means extending beyond said hopper;
   (c) an electric motor mounted on said bracket means and provided with a rotatable drive shaft extending from said motor in essentially perpendicular relationship to said bracket means;
   (d) wheel means fixedly mounted on said drive shaft with a portion of the periphery of said wheel means in registration with said slot in said hopper, said wheel means rotatable with respect to said bracket means and responsive to activation of said electric motor; and
   (e) food engaging means secured to the periphery of said wheel means for periodic traversal of said slot and engagement of the particles of food in said hopper when said wheel means rotates in registration with said slot.

2. The frog feeding apparatus of claim 1 further comprising a light bulb and a cooperating light bulb socket attached to said frame.

3. The frog feeding apparatus of claim 1 further comprising a flexible food seat in the bottom of said hopper adjacent to said slot and provided with apertures to periodically accommodate and register with said food engaging means as said wheel means rotates.

4. The frog feeding apparatus of claim 1 further comprising:
   (a) A light bulb and a cooperating light bulb socket attached to said frame; and
   (b) A flexible food seat in the bottom of said hopper adjacent to said slot and provided with apertures to periodically accommodate and register with said food engaging means as said wheel means rotates.

5. The frog feeding apparatus of claim 4 further comprising contact means carried by said wheel means and describing a circular path about said drive shaft as said wheel means rotates, and vibrator means mounted on said bracket means and extending into said circular path of said contact means for periodic tensioning of said vibrator means and corresponding vibration of said hopper to help move the food particles onto said flexible food seat adjacent to said wheel means and into the rotational path of said food engaging means.

6. The frog feeding apparatus of claim 1 further comprising:
   (a) A light bulb and a cooperating light bulb socket attached to said frame;
   (b) A flexible food seat in the bottom of said hopper adjacent to said slot and provided with apertures to periodically accommodate and register with said food engaging means as said wheel means rotates; and
   (c) Contact means carried by said wheel means and describing a circular path about said drive shaft as said wheel means rotates, and vibrator means mounted on said bracket means and extending into said circular path of said contact means for periodic tensioning of said vibrator means and corresponding vibration of said hopper to help move the food particles onto said flexible food seat adjacent to said wheel means and into the rotational path of said food engaging means.

7. A frog feeding apparatus for automatically dispensing discrete particles of food from an angular, elevated position to frogs below the apparatus, comprising:
   (a) a hopper containing the particles of food and having two sides in a generally V-shaped configuration, and a first end and a second end closing said sides, with a vertical slot in said first end;

(b) a frame carrying said hopper and including a bracket having a projecting end extending past said first end of said hopper;

(c) an electric motor mounted on said projecting end of said bracket and provided with a rotatable drive shaft protruding outwardly of said motor and in essentially perpendicular relationship with respect to said projecting end of said bracket;

(d) a wheel fixedly carried by said drive shaft and having a portion of the circumference and periphery of said wheel extending in rotatable registration with said slot in said first end of said hopper; and (e) food engaging hooks fitted to the outer periphery of said wheel for engaging individual ones of said particles of food, lifting the particles of food from repose on said hopper, and dropping the particles of food to said frogs when said electric motor is activated and said wheel is caused to rotate upwardly through said slot.

8. The frog feeding apparatus of claim 7 further comprising a flexible food seat secured to the bottom of said hopper adjacent to said slot and provided with apertures to periodically accommodate and register with said food engaging hooks as said wheel rotates, and a light bulb and a cooperating light bulb socket attached to said frame and in electrical cooperation with said electric motor for illuminating said apparatus and enabling said frogs to see and eat the food particles as the food particles are dispensed from said hopper by said wheel.

9. The frog feeding apparatus of claim 8 further comprising contact means on said wheel near said drive shaft to describe a circle about said drive shaft as said wheel rotates, and a vibrator shaft having one end secured to said bracket and the opposite end extending in said circle described by said contact means, whereby said contact means periodically engages and tensions said vibrator shaft and causes said hopper to vibrate and move the food particles in close proximity to said wheel for engagement by said food engaging hooks.

* * * * *